Aug. 9, 1960 H. K. IHRIG 2,948,605

NODULAR IRON

Filed Oct. 11, 1952 5 Sheets-Sheet 1

Inventor
Harry K. Ihrig
By Richard R Wybeck
Attorney

Aug. 9, 1960 H. K. IHRIG 2,948,605

NODULAR IRON

Filed Oct. 11, 1952 5 Sheets-Sheet 2

Inventor
Harry K. Ihrig
by Richard R. Wybeck
Attorney

Inventor
Harry K. Ihrig
by Richard R Mybeck
Attorney

Aug. 9, 1960 H. K. IHRIG 2,948,605

NODULAR IRON

Filed Oct. 11, 1952 5 Sheets-Sheet 4

CHEMICAL COMPOSITION OF CAST METAL AND NODULARIZING SUBSTANCE OF HEAT

| Cast Metal Sample No. | Nodularizing Substance (Percent by Weight) | | | As-Cast (Percent by Weight) | | | | | | | |
|---|---|---|---|---|---|---|---|---|---|---|---|
| | Others | $MgCl_2$ | NaCl | T.C. | Si | P | S | Mn | Mg | Na | Ca |
| 1 | - | - | 4.41 | 3.15 | 4.83 | .030 | .002 | .13 | .001 | .0005 | .004 |
| 2 | - | - | 4.41 | 3.13 | 2.48 | .025 | .002 | .11 | .001 | .0005 | .002 |
| 3 | - | - | 4.42 | 3.65 | 3.35 | .035 | .005 | .25 | .001 | .0005 | .001 |
| 4 | - | - | 4.37 | 2.83 | 4.03 | .020 | .003 | .14 | .001 | .0005 | .003 |
| 5 | - | 0.48 | 3.31 | 3.01 | 2.89 | .035 | .008 | .10 | .014 | .0005 | .002 |
| 6 | - | 0.54 | 5.40 | 2.93 | 3.48 | .045 | .011 | .10 | .019 | .0005 | .010 |
| 7 | - | 1.06 | 1.06 | 3.28 | 3.21 | .040 | .008 | .17 | .025 | .001 | .003 |
| 8 | - | 0.88 | 2.67 | 3.43 | 2.85 | .030 | .008 | .14 | .023 | .001 | .003 |
| 9 | - | 0.59 | 2.72 | 3.17 | 3.63 | .040 | .002 | .14 | .011 | .001 | .002 |
| 10 | - | 0.44 | 2.18 | 2.91 | 3.61 | .035 | .005 | .14 | .012 | .001 | .001 |
| 11 | - | 0.22 | 3.99 | 3.35 | 3.27 | .035 | .005 | .13 | .005 | .0005 | .002 |
| 12 | - | 0.71 | 1.89 | 3.38 | 3.34 | .051 | .007 | .15 | .023 | .001 | .003 |
| 13 | - | 1.43 | 1.19 | 3.56 | 1.99 | .055 | .012 | .12 | .024 | .001 | .002 |
| 14 | - | 1.35 | 0.20 | 3.50 | 2.33 | .031 | .013 | .14 | .027 | .0005 | .001 |
| 15 | - | 0.49 | 4.02 | 3.30 | 2.62 | .036 | .007 | .08 | .008 | .0005 | .001 |
| 16 | - | 0.49 | 4.01 | 3.48 | 3.30 | .039 | .013 | .04 | .009 | .001 | .021 |
| 17 | - | 0.49 | 4.01 | 3.39 | 3.00 | .032 | .005 | .07 | .009 | .0005 | .001 |
| 18 | NaBr | - | - | 3.01 | 4.46 | .032 | .011 | .07 | .001 | .001 | .007 |
| 19 | NaBr | - | - | 3.01 | 4.15 | .026 | .013 | .06 | .001 | .001 | .002 |
| 20 | NaF | - | - | 3.06 | 4.11 | .048 | .007 | .03 | .001 | .001 | .004 |
| 21 | NaF | - | - | 3.17 | 3.70 | .036 | .012 | .06 | .001 | .001 | .004 |
| 22 | NaF | - | - | 2.96 | 4.30 | .040 | .016 | .07 | .001 | .001 | .002 |
| 23 | NaI | - | - | 2.46 | 5.22 | .04 | .014 | .22 | .001 | .001 | .002 |

Fig. 7

Inventor
Harry K. Ihrig
by John Stevens Lieb
Attorney

Aug. 9, 1960 H. K. IHRIG 2,948,605

NODULAR IRON

Filed Oct. 11, 1952 5 Sheets-Sheet 5

PHYSICAL PROPERTIES (AS-CAST)

| Cast Metal Sample No. | Tensile Strength (psi) | Yield Point (psi) | Elongation in 2 in. (%) | Brinell Hardness |
|---|---|---|---|---|
| 1 | 90,200 | 85,000 | 3 | 207 |
| 2 | 81,400 | 72,000 | 7 | 197 |
| 3 | 65,150 | | 10 | 163 |
| 4 | 77,700 | 72,500 | 4 | 207 |
| 5 | 69,000 | 55,000 | 15 | 170 |
| 6 | 72,800 | 60,000 | 11 | 179 |
| 7 | 81,900 | 51,000 | 12 | 179 |
| 8 | 72,100 | 56,000 | 17 | 163 |
| 9 | 78,400 | 66,000 | 18 | 187 |
| 10 | 90,500 | 80,000 | 17 | 217 |
| 11 | 69,000 | 53,000 | 7 | 163 |
| 12 | 77,800 | 63,000 | 21 | 179 |
| 13 | 76,500 | 41,600 | 12 | 163 |
| 14 | 75,300 | 50,000 | 8 | 170 |
| 15 | 71,000 | 58,000 | 20 | 159 |
| 16 | 67,600 | 55,500 | 15.5 | 170 |
| 17 | 63,500 | 51,000 | 15.5 | 163 |
| 18 | 75,000 | 70,000 | 2.5 | 207 |
| 19 | 69,800 | 65,000 | 3.5 | 192 |
| 20 | 70,800 | 56,000 | 6 | 187 |
| 21 | 74,800 | 61,400 | 7.5 | 187 |
| 22 | 86,000 | 79,000 | 5.0 | 212 |
| 23 | 71,200 | | | 255 |

Fig. 8

Inventor
Harry K. Ihrig
by John Stevens Lieb
Attorney 2,948,605

NODULAR IRON

Harry K. Ihrig, Milwaukee, Wis., assignor to Allis-Chalmers Manufacturing Company, Milwaukee, Wis.

Filed Oct. 11, 1952, Ser. No. 314,328

5 Claims. (Cl. 75—130)

This invention relates generally to ferrous metal alloy compositions and specifically to as-cast iron-carbon alloy compositions containing spherular granules of graphite.

A ferrous metal alloy which comprises essentially iron, silicon and carbon, the latter element being present in amounts in excess of 1.7 percent, is commonly termed cast iron. Cast iron in which the carbide of iron (cementite) has been dissociated to a substantial degree into graphite and carbon-free iron (ferrite) is commonly termed gray cast iron, because of its gray appearance on fracture.

In gray cast iron the free carbon is normally present in the form of graphite flakes embedded in a metallic matrix. Since graphite is a structurally weak substance, its presence in the matrix in the form of flakes of varying lengths, oriented at random and often substantially interconnected, introduces into the metal what amounts to strings of voids or weak spots breaking up the continuity of the matrix. As a result, the size, distribution, and grouping of the graphite flakes largely determine the physical properties of the cast metal. These properties, particularly tensile strength, yield point and percent elongation may be improved if the flakes are (1) reduced in size, (2) uniformly distributed, and (3) arranged in specialized patterns throughout the matrix. However, the foundry operations required to form flakes of this character are necessarily complex. In making high strength gray cast iron, for example, desirable flake characteristics can only be effected by carefully controlling the composition and cooling of the melt. And even with such control, so long as substantially all the graphite remains in flake form, there is a definite limit to which the physical properties of cast iron may be improved.

However, if a sufficient amount of the graphite present in cast iron can be made to assume a compacted form (varyingly described as rounded, nodular, spherulitic, spheroidal or spherular), instead of a flake form, the physical properties of the cast metal, particularly ductility, will be markedly improved. This sufficient amount of graphite in compacted form may exceed considerably the minimum quantity essential for obtaining such marked improvement, and is defined and hereafter referred to as an "effective" amount. If, in addition, this effective amount of spherular graphite can be made to appear in an iron that is as-cast, then the foundry operations can be greatly simplified. By "as-cast," as used herein, is meant the condition of a metal mass which has been brought from a liquid state above its melting point to a cold solidified state by cooling at a rate typical of the rate of cooling of castings in normal foundry practice.

An effective amount of spherular graphite has been found by experiment to range from approximately 20 to 100 percent (by inspection) of the free carbon present, but an effective amount may in some cases be slightly less than 20 percent.

When the graphite is in compacted form, it appears as essentially spheroidal islands surrounded by seas of ferrite (carbon-free iron) or pearlite (alternate plates of cementite and ferrite). Thus, a metallic matrix having an effective amount of its graphite in compacted form more nearly approaches continuity and more nearly approaches freedom from the weakening discontinuities inherent in a matrix having substantially all flake or flake-like inclusions of graphite.

The recognized superior physical properties of so-called malleable cast iron, which is made from white iron (an iron with all the carbon in combined form), are attributable directly to the compacted form of the graphite inclusions, although such inclusions (called "temper carbon") are not strictly nodular or spherulitic, as the terms are used herein.

As-cast ferrous metal which exhibits a microstructure characterized by the presence of an effective amount of compacted graphite inclusions which are nodular or spherulitic has come to be known variously as "ductile cast iron," "ductile iron," "nodular graphitic cast iron," "nodular cast iron," or simply "nodular iron." Because of its superior physical properties, which resemble those of steel in many respects, "nodular iron," as it will be hereinafter referred to, is deemed a highly desirable material for many structural purposes.

Nodular iron's advantage lies not only in the fact that it is easily machined and has improved physical properties but also in the fact that nodular iron may be cast in large sections directly from the melt without subsequent heat treating; and since little equipment is needed it can be produced at a cost comparable to that of ordinary gray iron. Whereas, malleable cast iron, which has physical properties superior to gray cast iron but generally inferior to nodular iron, is derived only from white cast iron which has been subjected to a costly time consuming and relatively complicated heat treatment.

Nodular iron, understandingly, has heretofore drawn the attention of investigators, with the result that several compositions of nodular iron have been proposed, among which are as-cast nodular irons containing nodular inducing substances not heretofore present in ordinary gray irons in the as-cast state.

These nodular iron compositions have been made by various methods. Many of the methods have one step in common. They call for alloying with a graphite-yielding ferrous metal, while the metal is molten, one or more substances, usually in metallic form, capable of inducing the appearance in the as-cast metal of graphite spherulites. Among the substances heretofore selected for alloying with the ferrous metal have been magnesium, cerium, calcium, strontium, barium, tellurium and zirconium. Of these, cerium and magnesium have been of the most interest to foundrymen.

The prior art, in teaching the use of these substances in the manufacture of nodular iron, specifies in some cases retention of controlled amounts of the substances in the as-cast metal if the metal is to contain spherulitic graphite and have desirable physical characteristics. In the case of cerium-bearing nodular irons, the known prior art teaches that the retained cerium content of the as-cast ferrous metal must lie between 0.015 and 5 percent. In the case of magnesium-bearing nodular irons, in which magnesium is the essential spherulitic graphite inducing substance, the known prior art teaches that the retained magnesium content of the as-cast ferrous metal must lie between 0.030 and 0.5 percent.

If the retained magnesium content falls below 0.030 percent, the known prior art states that the as-cast ferrous metal is no longer nodular but contains instead flake graphite inclusions. If the retained magnesium content is greater than 0.5 percent, the as-cast ferrous metal contains free carbides. Thus, to produce these prior art nodular irons calls for a nicety of process control undesirable in ordinary foundry practice.

Both cerium and magnesium in metallic form, moreover, are relatively expensive materials compared with the ferrous metal into which they are introduced. Cerium has the added drawback of only working effectively with hypereutectic (high carbon) and low phosphorus ferrous metals.

Furthermore, magnesium metal, which the prior art teaches is a satisfactory spherulitic graphite inducer, is generally alloyed with nickel or copper for introduction into the molten ferrous metal, so that nodularizing with magnesium metal requires the use of not one but two metals which are relatively expensive.

Nickel and copper introduced into molten ferrous metal are retained in the casting when it cools. Their retention is undesirable when there is likelihood that the cast metal may later be scrapped, since nickel and copper cannot economically be removed from the scrap metal. In addition, the metals nickel, copper, cerium and magnesium are strategic materials necessary for national defense purposes. In times of war or national emergency, these metals may be so strictly allocated as to be virtually unobtainable.

If when brought together with graphite-yielding molten ferrous metals one or more substances can be found which will furnish a suitable agent for inducing the appearance of spherulitic graphite in as-cast ferrous metal without the necessity of the substance or the agent being retained in controlled amounts in the final casting, the making of nodular iron may be made simpler.

If the substances which furnish the nodularizing agent are also widely found in nature in usable form at a lower cost than prior art substances, and need not be in metallic form, then nodular iron can be made cheaper than heretofore.

If the substances which furnish the nodularizing agent are evanescent, the nodular iron will be purer, since there will be substantially no retained amounts of the agent as an impurity in the final casting.

If, in addition, the substance which furnishes the nodularizing agent can be used effectively with a prior art material such as magnesium, in a process like that disclosed in copending application Serial No. 262,957, filed December 22, 1951, now Patent 2,750,284, granted June 12, 1956, to produce an as-cast iron having a retained magnesium content less than the minimum taught by the prior art, then magnesium-bearing nodular irons can be made cheaper and more simply than heretofore and with a greater saving for other purposes of magnesium metal.

One substance which has all the aforementioned characteristics, but which has heretofore gone unrecognized as a source of a spherulitic graphite inducing agent, is the halide salt, sodium chloride. This halide salt, when brought together with molten graphite-yielding ferrous metal and a suitable reducing material, introduces into the melt a powerful nodularizing agent; namely, sodium. Sodium has not been heretofore identified in the prior art as an evanescent nodular graphite-inducing agent and its use in that regard is an aspect of this invention.

Nodular iron made with sodium chloride as a source of sodium has the desirable physical properties associated with nodular iron made by using other nodular-inducing agents such as cerium or magnesium metal, yet is substantially devoid in the as-cast state of retained sodium.

Nodular iron made with sodium chloride as a source of sodium is cheaper than nodular iron made with cerium or magnesium metal because the necessary sodium can be obtained from the chloride salt without any prior reduction of the sodium, or without alloying sodium metal with some other metal for the purpose of avoiding the hazards accompanying the addition of elemental sodium to molten ferrous metal.

Nodular iron made by using both sodium chloride and magnesium chloride as sources of the respective nodular graphite inducing agents, sodium and magnesium, has the desirable physical properties associated with nodular iron made by using other nodular inducing materials such as cerium metal or magnesium metal. Nodular iron made with sodium chloride and magnesium chloride is substantially devoid in the as-cast state of retained sodium and has a retained magnesium content less than the minimum taught by the prior art.

Other substances which, when brought together with molten graphite-yielding ferrous metal, have proven to be satisfactory sources of the nodularizing agent sodium are the remaining halide salts, sodium fluoride, sodium bromide and sodium iodide.

Nodular iron made with sodium fluoride as a source of sodium has the desirable physical properties associated with nodular iron made by using other nodular inducing materials such as cerium or magnesium metal, yet is substantially devoid in the as-cast state of retained sodium.

Nodular irons made with sodium bromide or sodium iodide are similarly substantially devoid in the as-cast state of retained sodium.

Thus the sodium halides provide a satisfactory source for the spherulitic graphite inducing agent, sodium, and nodular irons made with the sodium halides are substantially devoid in the as-cast state of retained sodium.

It is therefore the primary object of the present invention to not only avoid the aforementioned disadvantages but also obtain the aforementioned advantages through the provision of a novel purer as-cast ferrous metal composition containing spherular graphite.

Another object of the present invention is to provide a novel as-cast spherulitic-graphite-containing metal composition which is substantially devoid of the substance which induced the appearance of the graphite spherulites in the as-cast metal.

Another object of the invention is the provision of a novel as-cast nodular graphite ferrous metal composition which does not contain nickel, copper or cerium in the as-cast state.

Another object of the invention is to provide a novel as-cast nodular graphite ferrous metal composition which has physical properties in the as-cast state superior to the physical properties of ordinary gray cast iron in the as-cast state but which contains substantially no elements other than those ordinarily found in standard gray cast iron.

Another object of the invention is to provide a novel as-cast nodular graphite ferrous metal composition which has a tensile strength, yield point, and ductility similar to that of steel.

Another object of the invention is to provide a novel as-cast nodular graphite ferrous metal composition which has a modulus of elasticity substantially equal to or greater than that of malleable cast iron.

Another object of the invention is to provide a novel as-cast nodular graphite ferrous metal composition which is cheaper and simpler to make than nodular irons heretofor produced.

Another object of the invention is the provision of a novel as-cast magnesium-bearing nodular iron composition which contains retained magnesium as the sole remaining nodularizing element in the as-cast state in lesser amounts than the prior art as-cast magnesium-bearing nodular irons.

Another object of the invention is the provision of a novel as-cast nodular graphite ferrous metal made by using two different nodular graphite inducing substances, only one of which is retained in the as-cast state.

Another object of the invention is the provision of a novel as-cast nodular graphite ferrous metal made from a graphite-yielding ferrous melt which when incipiently cooling to the solid state and precipitating the graphite in spherular form surrenders substantially all the nodular graphite inducing substance formerly present in the melt.

Another object of the invention is the provision of a novel as-cast nodular graphite ferrous metal composition formed by the reaction between a reducing agent and nodularizing salt containing an evanescent nodularizing agent in the presence of a graphite-yielding ferrous metal melt.

Other objects and advantages will be apparent from the following description and accompanying drawings which form part of the specification.

In the drawing:

Fig. 7 is a table showing the chemical composition (in percent by weight) of specific examples of the novel as-cast nodular graphite ferrous metal (the elements in the composition being identified by their chemical symbols); and Fig. 8 is a table giving the physical properties of the novel as-cast nodular graphite ferrous metals identified in the table of Fig. 7.

The present invention proposes to preferably achieve the foregoing objects by the provision of a novel as-cast nodular iron made by a process similar to the one described in copending application Serial No. 262,957, filed December 22, 1951, now Patent 2,750,284, granted June 12, 1956, of which this application is a continuation-in-part. The process for producing the novel as-cast nodular iron briefly comprises the steps of bringing together molten ferrous metal containing graphite-yielding carbon, a sufficient quantity of a nodular graphite-inducing substance comprising a halide of sodium either alone or together with a sufficient quantity of a halide of magnesium (depending upon whether a magnesium-bearing or a magnesium-free type of nodular iron is desired in the as-cast state) and a suitable reducing agent such as calcium silicide or the equivalent capable of reducing the halide of sodium and the halide of magnesium, if the latter is present, and then solidifying the molten metal while the nodular graphite-inducing substance is effective in causing the appearance in the as-cast metal of graphite spherulites.

Although the chloride salts of sodium and magnesium are preferred for making the novel nodular iron of this invention, the iodide, fluoride and bromide salts of sodium lend themselves equally well as sources of sodium.

The select method, however, because of its cheapness, simplicity and safety is to use sodium chloride as the nodularizing material.

Nodular iron which is made with sodium chloride is characterized in the as-cast state by a chemical composition which is substantially devoid of sodium. In other words, the sodium detectable in the nodular iron is never more than is detectable in the base iron and in any case is never more than 0.001 percent. Nodular iron made with sodium chloride is further characterized by the physical properties of high tensile strength, yield point and percent elongation, and by a modulus of elasticity around 27,000,000 p.s.i.

Figure 1:
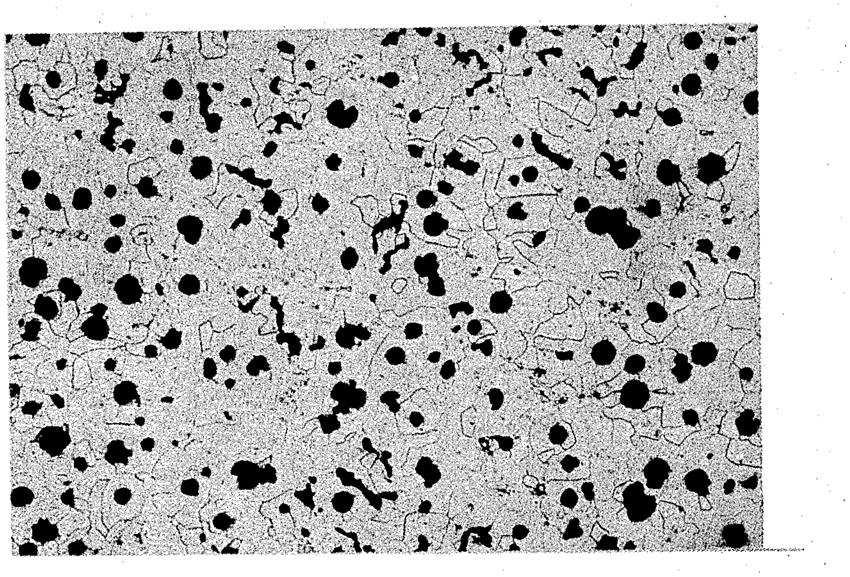
Fig. 1 is a photomicrograph (×100) of a section of a sample of the novel as-cast nodular graphite ferrous metal composition substantially free of the nodular graphite inducing element sodium.
Figure 2:
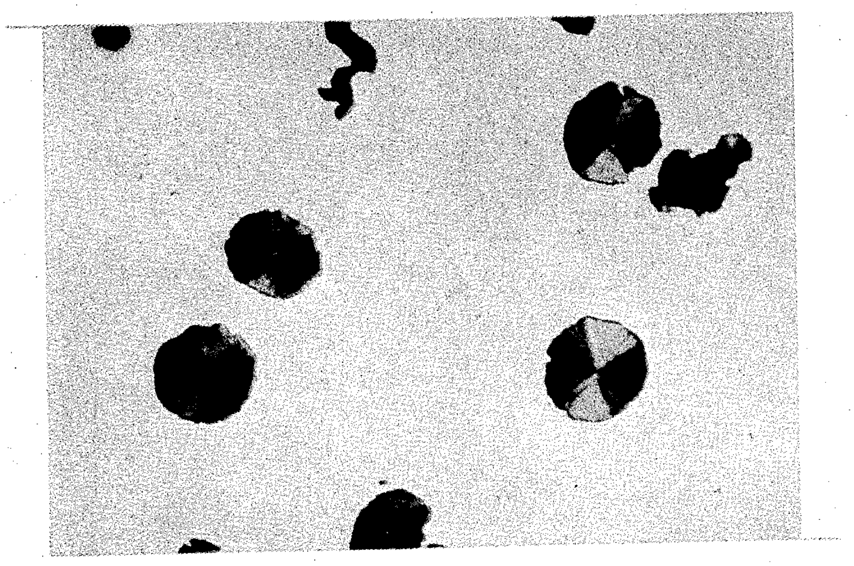
Fig. 2 is a photomicrograph (×500) of a section of a sample of an as-cast nodular graphite ferrous metal made with sodium chloride as the source of the nodular graphite inducing element sodium, the as-cast metal being substantially devoid of sodium. The photomicrograph illustrates in more detail the structural form of the spherular graphite appearing in the as-cast metal.

For example, a molten base iron (which analyzed percent by weight as follows: carbon 4.20, silicon 0.75, phosphorus 0.035, sulfur 0.039, manganese 0.10, sodium less than 0.0005 and the remainder essentially iron), after initially being treated with calcium silicide 0.69 and subsequently brought together with sodium chloride 4.41 and calcium silicide 6.63 (as percentages of the total furnace charge) yielded, upon cooling from 2800° F., an as-cast ferrous metal having a micro-structure (see Figs. 1 and 2) characterized to a significant degree by the presence of compacted graphite inclusions which were essentially nodular or spherulitic. The as-cast ferrous metal was further characterized by a tensile strength of 90,200 p.s.i., yield point of 85,000 p.s.i., elongation 3 percent and Brinell hardness 207. The as-cast metal had the following chemical composition (percent by weight, as analyzed from a sample of the metal): total carbon 3.15, silicon 4.83, phosphorus 0.030, sulfur 0.002, manganese 0.13, calcium 0.004, sodium less than 0.0005, magnesium less than 0.001, and the remainder essentially iron.

The presence in the final casting of less than 0.001 magnesium may be explained by the presence of small amounts of magnesium carbonate found in commercial sodium chloride to prevent the sodium salt from caking under adverse moisture conditions.

The base iron from which the aforementioned as-cast nodular iron composition was derived had a tensile strength of about 12,000 p.s.i., yield point of about 7,500 p.s.i. and substantially zero percent elongation.

The microstructure of the sample of the as-cast nodular iron has an effective amount; namely, about 90 percent, of the graphite in essentially nodular form and about 10 percent as compacted graphite. The matrix is almost entirely ferrite.

Nodular iron which is made by using both sodium chloride and magnesium chloride is marked in the as-cast state by the substantial absence of sodium and substantially less than the prior art teaching of required amounts of retained magnesuim in the composition of the final casting.

Figure 3:
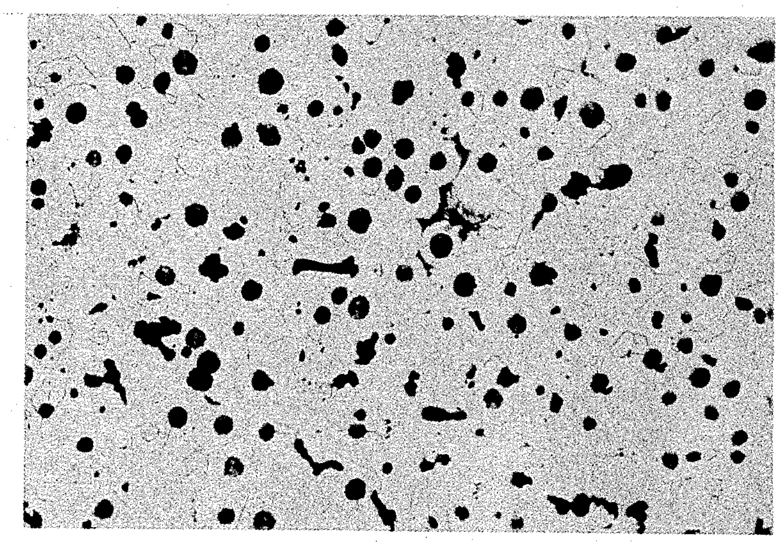
Fig. 3 is a photomicrograph (×100) of a section of a sample of an as-cast nodular graphite ferrous metal made with sodium chloride and magnesium chloride as the sources for the respective nodular graphite inducing elements sodium and magnesium, the as-cast ferrous metal being substantially devoid of sodium but containing small amounts of magnesium.

For example, a molten base iron (which analyzed percent by weight as follows: carbon 3.61, silicon 0.49, phosphorus 0.020, sulfur 0.029, manganese 0.08, sodium less than 0.0005, and the remainder essentially iron) after initially being treated with calcium silicide 0.70 and subsequently being brought together with sodium chloride 5.40, magnesium chloride 0.54, ferrosilicon 0.19, and calcium silicide 6.05 (as percentages of the total furnace charge) yielded upon cooling from 2700° F., an as-cast ferrous metal having a microstructure (see Fig. 3) characterized to a significant degree by the presence of compacted graphite inclusions which were essentially nodular or spherulitic. The as-cast metal was further characterized by a tensile strength of 72,800 p.s.i., yield point 60,000 p.s.i., elongation 11 percent, Brinell hardness 179, and had the following chemical composition (as analyzed percent by weight of the as-cast metal): total carbon 2.93, silicon 3.48, phosphorus 0.045, sulfur 0.011, manganese 0.10, magnesium 0.019, calcium 0.010, sodium less than 0.0005, and the remainder essentially iron.

It should be noted that in the last example the retained magnesium content percentage 0.019 of the final casting is about two-thirds the percentage, namely 0.030, which the prior art teaches is the absolute minimum below which the as-cast metal will not be nodular.

Examples of as-cast nodular iron made respectively with sodium bromide, sodium fluoride, and sodium iodide are as follows:

A molten base iron (which analyzed percent by weight as follows: carbon 3.97, silicon 0.58, phosphorus 0.036, sulfur 0.026, manganese 0.07, sodium less than 0.001 and the remainder essentially iron) after initially being treated with calcium silicide 0.67 and subsequently being brought together with sodium bromide 7.62 and calcium silicide 6.10 and ferrosilicon 0.18 (as percentages of the total furnace charge) yielded upon cooling from 2780° F., an as-cast ferrous metal having a microstructure (see Fig. 4) characterized to a significant degree by the presence of compacted graphite inclusions which were essentially nodular or spherulitic. The as-cast metal was further characterized by a tensile strength of 75,000 p.s.i., yield point 70,000 p.s.i., elongation 2.5 percent, Brinell hardness 207, and had the following chemical composition (as analyzed percent by weight of the as-cast metal): total carbon 3.01, silicon 4.46, phosphorus 0.032, sulfur 0.011, manganese 0.07, magnesium less than 0.001, calcium 0.007, sodium less than 0.001, and the remainder essentially iron.

A molten base iron (which analyzed percent by weight as follows: carbon 3.36, silicon 0.35, phosphorus 0.04, sulfur 0.02, manganese 0.03, sodium less than 0.001, and the remainder essentially iron) after initially being treated with calcium silicide 0.70, and subsequently being brought together with sodium fluoride 3.32 and calcium silicide 6.38 and ferrosilicon 0.19 (as percentages of the total furnace charge) yielded upon cooling from 2740° F., an as-cast ferrous metal having a microstructure (see Fig. 5) characterized to a significant degree by the presence of compacted graphite inclusions which were essentially nodular or spherulitic. The as-cast metal was further characterized by a tensile strength of 70,800 p.s.i., yield point 56,000 p.s.i., elongation 6 percent, Brinell hardness 187, and had the following chemical composition (as analyzed percent by weight of the as-cast metal): total carbon 3.06, silicon 4.11, phosphorus 0.048, sulfur 0.007, manganese 0.03, magnesium less than 0.001, calcium 0.004, sodium less than 0.001, and the remainder essentially iron.

A molten base iron (which analyzed percent by weight as follows: total carbon 3.97, silicon 0.58, phosphorus 0.036, sulfur 0.026, manganese 0.07, sodium less than 0.001, and the remainder essentially iron) after initially being treated with calcium silicide 0.63 and manganese 0.09, and subsequently being brought together with sodium iodide 10.51 and calcium silicide 8.58 (as percentages of the total furnace charge) yielded upon cooling from 2850° F., an as-cast ferrous metal having a microstructure (see Fig. 6) characterized to a significant degree by the presence of compacted graphite inclusions which were essentially nodular or spherulitic. The as-cast metal was further characterized by a tensile strength of 71,200 p.s.i., Brinell hardness 255, and had the following chemical composition (as analyzed percent by weight of the as-cast metal): total carbon 2.46, silicon 5.22, phosphorus 0.04, sulfur 0.014, manganese 0.22, magnesium less than 0.001, calcium 0.002, sodium less than 0.001, and the remainder essentially iron.

More examples of novel as-cast nodular iron compositions made with the various halide salts of sodium and examples in which a further nodularizing substance, magnesium chloride, was used are given in the table of Fig. 7.

The physical properties of the as-cast nodular iron compositions of Fig. 7 are given in the table of Fig. 8 and were ascertained by actual measurements.

Each example of iron in the tables represents a novel as-cast nodular iron composition made from base materials which initially had tensile strengths around 12,000 p.s.i., yield points around 7,500 p.s.i., and elongations from 0 to 1.0 percent.

The range of total carbon content in the as-cast nodular ferrous metal composition will depend upon the carbon content of the base ferrous metal from which the nodular ferrous metal is produced. The invention contemplates as-cast nodular ferrous metal compositions having a total carbon content ranging approximately from 0.8 to 6.7 percent carbon, the latter figure being set by convenience in melting and utility of the material produced, but the preferred carbon range is from 2.5 to 4.0 percent.

The manganese content of the as-cast ferrous metal composition may range from about 0.03 to about 1.0 without effecting to any perceptible extent the structure of the matrix, however the preferred range of manganese content is about 0.03 to about 0.50 in order to retain a reasonably high ductility.

The silicon content of the as-cast nodular ferrous metal compositions may range from about 1.5 to a little over 5 percent. Silicon is a graphitizing element which decomposes iron carbide (cementite) into carbon-free iron (ferrite) and free carbon (graphite). It more than any other element in the ferrous metal determines the relative proportions of cementite and ferrite in the final casting. The prior art teaches that at somewhat more than 3 percent, silicon will completely displace the iron carbide, and a material consisting of graphite in a matrix so high in dissolved silicon that it is hard, weak and nonductile is produced. While a silicon content between 3 and 5 percent does tend to result in an as-cast nodular iron less ductile than those produced with less silicon content, the prior art teaching that the iron will be weak is not borne out with as-cast nodular ferrous metal compositions of this invention. In fact nodular iron compositions as described herein show excellent physical properties with a silicon range of about 1.5 to a little over 5 percent.

The phosphorus content of the as-cast nodular ferrous metal compositions of this invention may range from 0.015 to 0.10 percent without appreciably affecting the strength of the final casting. However, to avoid any possible effect of the phosphorus content reducing the strength of the final casting the preferred range of phosphorus content is from 0.015 to 0.060.

The sulfur content of the as-cast nodular ferrous metal compositions of the invention may range from a trace to 0.016 percent without having any perceptible effect on the physical characteristics of the final casting.

The calcium content is generally in the order of a trace to 0.007 percent although it may be higher if the nodular ferrous metal composition is made from a high sulfur iron which is first desulfurized by the addition of calcium oxide to the melt. Calcium in quantities from a trace to 0.021 percent appears to have no adverse effect on the physical and nodular properties of the final casting. Calcium alone is not a nodularizing element unless over 50 percent of nickel is present. Since the nodular ferrous metal compositions of this invention contain no nickel, the small amount of retained calcium can have no nodularizing effect.

The sodium content of the as-cast ferrous metal composition of this invention will never be more than 0.001 and often less than 0.0005 percent. The as-cast metal is thus substantially devoid of sodium even though sodium in the form of a sodium halide is brought together with the melt to induce the appearance of nodular graphite in the final casting.

The range of magnesium content of the as-cast ferrous metal composition will of course be dependent upon whether magnesium chloride is used as a nodularizing substance and also upon the amount of magnesium carbonate used as a noncaking agent in the sodium chloride. However, the invention contemplates a magnesium content ranging from less than a trace to under 0.030 percent in an as-cast nodular graphite ferrous metal.

The remainder of the chemical composition of the nodular ferrous metal of this invention is essentially iron.

An effective amount of the graphite in the matrix of the as-cast nodular ferrous metals of this invention is in compacted form and is essentially nodular or spherular as the term is used herein. As has been pointed out hereinbefore an "effective" amount of the graphite is that amount which is effective because of its spheroidal form in improving the physical properties such as tensile strength, yield point, and percent elongation of the as-cast metal.

Tensile strengths of the novel as-cast nodular ferrous metal compositions range from approximately 60,000 to over 90,000 p.s.i. with an average of about 75,000 p.s.i.

Yield points range from approximately 40,000 to 85,000 p.s.i. with an average of about 57,000 p.s.i.

Elongation in two inches ranges from approximately 2.5 to 21 percent with an average of about 10.0 percent.

Brinell hardness ranges from approximately 155 to 220 with an average of about 190.

The term ferrous metal containing graphite-yielding carbon, as used herein, defines a ferrous alloy which has sufficient carbon to form upon solidification of the metal from the liquid state, and upon cooling, a matrix microstructure characterized by compacted free carbon inclusions in the cold metal. Ferrous metal containing graphite-yielding carbon is the metal referred to as base iron in the examples described herein and is the metal from which all of the examples of as-cast nodular iron are produced.

Since the examples given are illustrative only, the invention is not to be limited thereto but may include equivalents, modifications and variations coming within the scope of the appended claims.

It is claimed and desired to secure by Letters Patent:

1. An as-cast ferrous metal product of heat reaction between a molten graphite-yielding ferrous metal which if cast would yield a gray iron, sodium chloride, and a reducing agent consisting essentially of calcium, said as-cast product being characterized by the presence of an amount of spherulitic graphite in its metallic matrix effective to give said product a tensile strength of at least 60,000 p.s.i., a yield strength of from 50,000 to 85,000 p.s.i., an elongation of from about 2½ to 21 percent and a Brinell hardness of from about 155 to 220, said product being further characterized by a chemical composition substantially devoid of sodium and consisting of 0.8 to 6.7 percent total carbon, about 1.5 to 5 percent silicon, about 0.015 to 0.10 percent phosphorus, up to 0.016 percent sulfur, 0.001 to less than 0.020 percent calcium, up to 0.5 percent manganese, and the remainder essentially iron.

2. An as-cast ferrous metal product of reaction between a molten graphite-yielding ferrous metal which if cast would yield a gray iron, a halide of sodium, and a reducing agent consisting essentially of calcium, said as-cast product being characterized by the presence of an amount of spherulitic graphite in its metallic matrix effective to give said product a tensile strength of at least 60,000 p.s.i., a yield strength of from about 50,000 to 85,000 p.s.i., an elongation of from about 2½ to 21 percent and a Brinell hardness of from about 155 to 220, said product being further characterized by a chemical composition substantially devoid of sodium and consisting of 0.8 to 6.7 percent total carbon, about 1.5 to 5 percent silicon, about 0.015 to 0.10 percent phosphorus, up to 0.016 percent sulfur, about 0.001 to less than 0.020 percent calcium, up to 0.5 percent manganese, and the remainder essentially iron.

Figure 4:
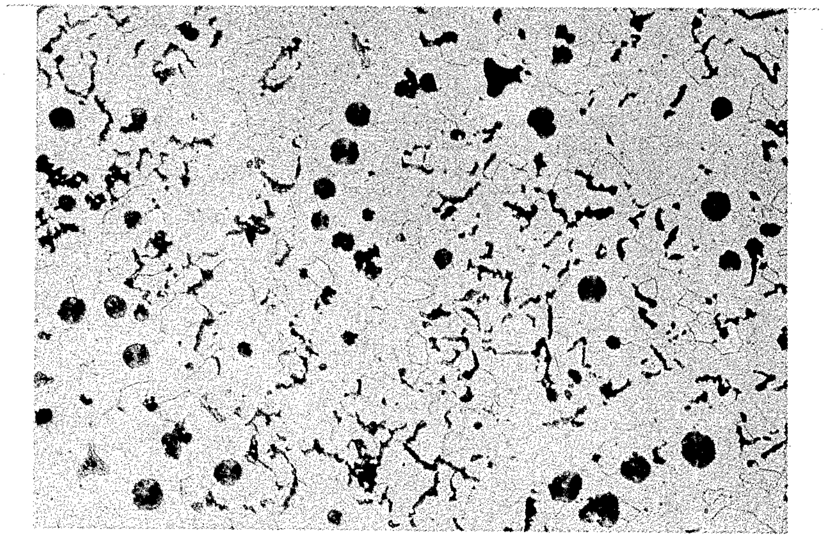
Fig. 4 is a photomicrograph (×100) of a section of a sample of an as-cast nodular graphite ferrous metal made with sodium bromide as the source of the nodular graphite inducing element, sodium, the as-cast ferrous metal being substantially devoid of sodium.

3. The product according to claim 2 in which said metallic matrix is as shown in Fig. 4.

Figure 5:
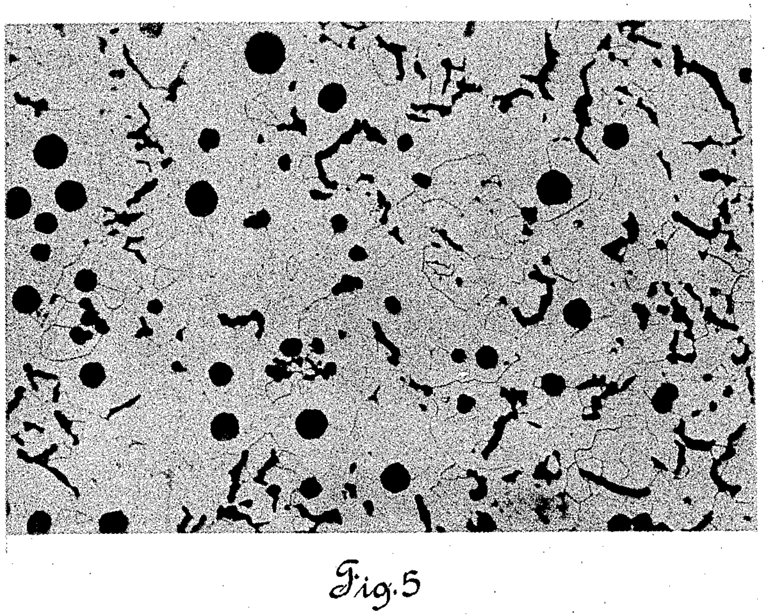
Fig. 5 is a photomicrograph (×100) of a section of a sample of an as-cast nodular graphite ferrous metal made with sodium fluoride as the source of the nodular graphite inducing element sodium, the as-cast ferrous metal being substantially devoid of sodium.

4. The product according to claim 2 in which said metallic matrix is as shown in Fig. 5.

Figure 6:
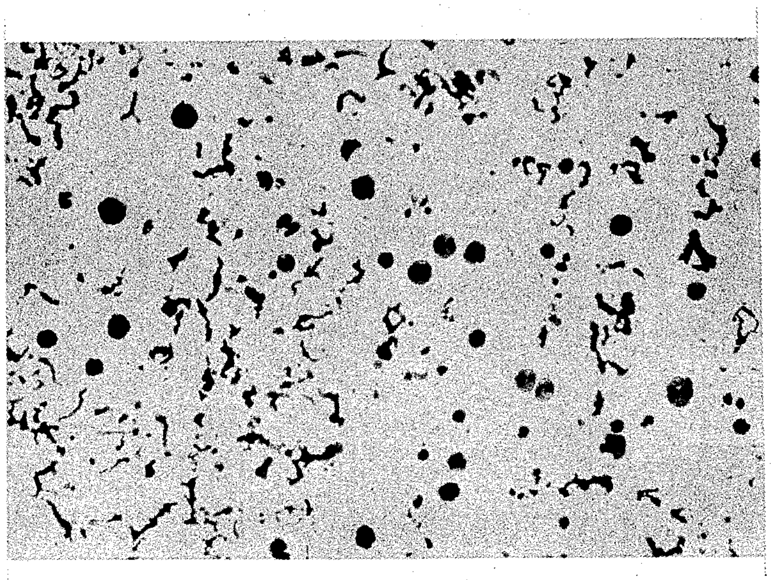
Fig. 6 is a photomicrograph (×100) of a section of a sample of an as-cast nodular graphite ferrous metal made with sodium iodide as the source of the nodular graphite inducing element sodium, the as-cast ferrous metal being substantially devoid of sodium.

5. The product according to claim 2 in which said metallic matrix is as shown in Fig. 6.

References Cited in the file of this patent

UNITED STATES PATENTS

| | | |
|---|---|---|
| 2,154,613 | Guthrie | Apr. 18, 1939 |
| 2,485,760 | Millis et al. | Oct. 25, 1949 |
| 2,527,037 | Smalley | Oct. 24, 1950 |
| 2,540,173 | Olivo | Feb. 6, 1951 |
| 2,552,204 | Morrogh | May 8, 1951 |
| 2,652,324 | Hignett | Sept. 15, 1953 |

FOREIGN PATENTS

| | | |
|---|---|---|
| 505,289 | Belgium | Sept. 15, 1951 |
| 638,255 | Great Britain | June 7, 1950 |
| 649,475 | Germany | Nov. 2, 1930 |

UNITED STATES PATENT OFFICE

CERTIFICATE OF CORRECTION

Patent No. 2,948,605 August 9, 1960

Harry K. Ihrig

It is hereby certified that error appears in the printed specification of the above numbered patent requiring correction and that the said Letters Patent should read as corrected below.

Column 9, line 43, after "from" insert -- about --.

Signed and sealed this 31st day of January 1961.

(SEAL)
Attest:

KARL H. AXLINE
Attesting Officer

ROBERT C. WATSON
Commissioner of Patents